United States Patent
Su et al.

(10) Patent No.: US 9,209,922 B2
(45) Date of Patent: Dec. 8, 2015

(54) LOSSLESS ADJUSTMENT METHOD OF ODUFLEX CHANNEL BANDWIDTH AND ODUFLEX CHANNEL

(75) Inventors: Wei Su, Chengdu (CN); Chiwu Ding, Chengdu (CN); Limin Dong, Shenzhen (CN); Qiuyou Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 13/315,525

(22) Filed: Dec. 9, 2011

(65) Prior Publication Data

US 2012/0082456 A1     Apr. 5, 2012

Related U.S. Application Data

(63) Continuation of application No. PCT/CN2009/072185, filed on Jun. 9, 2009.

(51) Int. Cl.
*H04J 3/16*     (2006.01)

(52) U.S. Cl.
CPC ............. *H04J 3/1652* (2013.01); *H04J 3/1664* (2013.01); *H04J 2203/0067* (2013.01); *H04J 2203/0098* (2013.01)

(58) Field of Classification Search
CPC ............. H04J 3/1605–3/167; H04J 2203/005; H04J 2203/0055; H04J 2203/0057–2203/006; H04J 2203/0064–2203/0071; H04J 2203/0091; H04J 2203/0098
USPC ......... 370/229–235, 236, 251–253, 321–324, 370/345, 347–350, 468–471, 474, 498, 501, 370/503, 507, 509–510
See application file for complete search history.

(56) References Cited

U.S. PATENT DOCUMENTS

2006/0067242 A1   3/2006   Bi
2006/0104309 A1*  5/2006   Vissers et al. .............. 370/474
(Continued)

FOREIGN PATENT DOCUMENTS

CN   1685671 A   10/2005
CN   1734986 A    2/2006
(Continued)

OTHER PUBLICATIONS

ITU-T, Telecommunication Standardization Sector of ITU; Recommendation G.709/Y.1331 (Mar. 2003); Series G: Transmission Systems and Media, Digital Systems and Networks, Digital terminal equipments—General, E 25054 (Apr. 5, 2004), Retrieved Feb. 8, 2014.*

(Continued)

*Primary Examiner* — Michael Thier
*Assistant Examiner* — Eric Myers
(74) *Attorney, Agent, or Firm* — Huawei Technologies Co., Ltd.

(57) ABSTRACT

The embodiments of the present application relate to the field of communications technologies, and disclose a method for adjusting bandwidth of a flexible Optical channel Data Unit (ODUflex) channel. The method includes: respectively adjusting, according to a bandwidth adjustment indication message, a quantity of time slots occupied by an ODUflex frame in a higher order optical channel data unit (HO ODU) at an egress side of each network node on an ODUflex channel; and adjusting, according to a rate adjustment indication message, a transmission rate of the ODUflex frame of each network node on the ODUflex channel, so as to unify the transmission rate of each network node on the ODUflex channel.

16 Claims, 6 Drawing Sheets

(56) References Cited

U.S. PATENT DOCUMENTS

| | | |
|---|---|---|
| 2006/0245357 A1 | 11/2006 | Ilan |
| 2007/0071443 A1 | 3/2007 | Fukumitsu |
| 2007/0104485 A1* | 5/2007 | Zhang ............................ 398/69 |
| 2007/0201462 A1 | 8/2007 | Ilan |
| 2008/0101377 A1* | 5/2008 | Kundu et al. ............ 370/395.51 |
| 2010/0054731 A1* | 3/2010 | Oltman et al. ................... 398/1 |
| 2012/0002965 A1* | 1/2012 | Bellato et al. .................. 398/52 |

FOREIGN PATENT DOCUMENTS

| | | |
|---|---|---|
| CN | 1756143 A | 4/2006 |
| CN | 1790993 A | 6/2006 |
| CN | 101039333 A | 9/2007 |
| CN | 101179351 A | 5/2008 |
| CN | 101291179 A | 10/2008 |
| RU | 2301499 C1 | 6/2007 |
| RU | 2364040 C2 | 8/2009 |
| WO | 2004028095 A1 | 4/2004 |

OTHER PUBLICATIONS

Extended European Search Report in corresponding European Patent Application No. 09845683.3 (Apr. 18, 2012).

Garner, "XP017446767—Timing Domain and Timing-Related Processes in an OTN Network Element," ITU-T Drafts, Nov. 2008, International Telecommunication Union, Geneva, Switzerland.

Jones, "Report of Interim Q11/15 Meeting—Sunnyvale, CA (Mar. 16-20, 2009)," Q11/15 Rapporteur, Study Group: 15, Working Party: 3 (Mar. 16-20, 2009).

Written Opinion of the International Searching Authority in corresponding PCT Application No. PCT/CN2009/072185 (Mar. 18, 2010).

International Search Report in corresponding PCT Application No. PCT/CN2009/072185 (Mar. 18, 2010).

Vissers, "Ethernet Services Supporting Transport Networks, Their Standardization and Future Development," Feb. 10, 2009, Huawei Technologies Co., Ltd, Shezhen, China.

Chinese Search Report in corresponding Chinese Patent Application No. 200980147853.5 (Apr. 18, 2013).

1$^{st}$ Office Action in corresponding Chinese Patent Application No. 200980147853.5 (Nov. 1, 2012).

Gao, Feng, "Bandwidth on Demand Service and Its Implementation," 2006, Beijing Institute of ZTE Corporation, Beijing, China.

* cited by examiner

LOSSLESS ADJUSTMENT METHOD OF ODUFLEX CHANNEL BANDWIDTH AND ODUFLEX CHANNEL

CROSS-REFERENCE TO RELATED APPLICATIONS

This application is a continuation of International Application No. PCT/CN2009/072185, filed on Jun. 9, 2009, which is hereby incorporated by reference in its entirety.

FIELD OF THE INVENTION

The present invention relates to the field of communications technologies, and in particular, to a lossless adjustment method of ODUflex channel bandwidth and an ODUflex channel.

BACKGROUND OF THE INVENTION

An optical transport network (OTN), as a core technology of a next generation transport network, is capable of implementing flexible scheduling and management of high-capacity services, and it increasingly becomes a mainstream technology of a backbone transport network.

With the rapid development of data services, the current OTN system can no longer satisfy the requirement of directly bearing multiple services with various rates. Aiming at the requirement, the Telecommunication Standardization Sector of the International Telecommunications Union (ITU-T) is discussing formulating a new flexible Optical channel Data Unit (ODUflex) frame to satisfy the requirement. The ODUflex frame may bear a packet service at any rate, and in this case, the ODUflex rate is opted to be n*1.24416 G, where $1 \le n \le 80$. Since the ODUflex frame cannot directly pass a line interface, and needs to be encapsulated in an Higher Order Optical channel Data Unit (HO ODU) and to be transported through a Higher Order Optical channel Transport Unit (HO OTU). A current mapping manner of an ODUflex frame in an HO ODU uses a generic mapping procedure (GMP), where the ODUflex frame occupies some time slots of the HO ODU.

A packet service traffic has a property of not changing in real time, so in different time periods, an ODUflex channel is required to provide various bandwidths to satisfy various packet service traffic, and is required not to affect the normal transmission of the packet service while the bandwidth of the ODUflex channel is adjusted.

Therefore, how to achieve the lossless adjustment of ODUflex channel bandwidth has become a practical problem that is to be solved while a packet service is borne through an ODUflex channel.

SUMMARY OF THE INVENTION

Embodiments of the present invention provide a lossless adjustment method of ODUflex channel bandwidth and an ODUflex channel. When an ODUflex channel is used to bear a packet service and when packet service traffic changes, the bandwidth of the ODUflex channel can be adjusted without affecting normal transmission of the packet service. In order to achieve the objectives, the embodiments of the present invention adopt the following technical solutions.

An embodiment of the present invention provides a lossless adjustment method of ODUflex channel bandwidth, which includes:

adjusting, according to a bandwidth adjustment indication message, a quantity of time slots occupied by an ODUflex frame in a HO ODU at an egress side of each network node on an ODUflex channel; and adjusting, according to a rate adjustment indication message, a transmission rate of the ODUflex frame at each network node on the ODUflex channel, so as to enable the transmission rate of each network node on the ODUflex channel to be unified.

An embodiment of the present invention provides a network for providing an ODUflex channel, which includes: a source network node, at least one intermediate network node and a destination network node. The source network node is configured to create a bandwidth adjustment indication message and a rate adjustment indication message, where the bandwidth adjustment indication message and the rate adjustment indication message are encapsulated in an HO ODU overhead or an ODUflex frame overhead and transmitted to the intermediate network node and the destination network node.

The source network node, intermediate network node and destination network node are configured to, respectively, adjust, according to the bandwidth adjustment indication message, a quantity of time slots occupied by an ODUflex frame in a HO ODU at an egress side.

The source network node, intermediate network node and destination network node are configured to adjust, according to the rate adjustment indication message, a transmission rate of the ODUflex frame.

The technical solutions provided in the embodiments of the present invention may achieve a lossless adjustment of ODUflex channel bandwidth by respectively adjusting a quantity of time slots occupied by an ODUflex frame in a HO ODU at an egress side of each network node on an ODUflex channel, and adjusting a transmission rate of an ODUflex frame of each network node on the ODUflex channel.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

The technical solutions of embodiments of the present invention will be clearly and comprehensively described in the following with reference to the accompanying drawings of the embodiments of the present invention. It is obvious that the embodiments to be described are only a part rather than all of the embodiments of the present invention. All other embodiments obtained by persons of ordinary skills in the art based on the embodiments of the present invention without creative efforts shall fall within the protection scope of the present invention.

Figure 1:
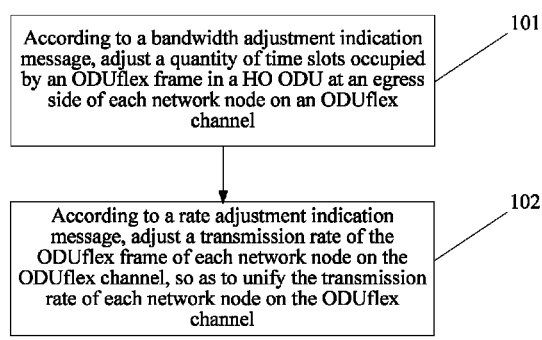
FIG. 1 is a flowchart of a lossless adjustment method of ODUflex channel bandwidth according to an embodiment of the present invention.

As shown in FIG. 1, an embodiment of the present invention provides a lossless adjustment method of ODUflex channel bandwidth. The method includes the following steps:

Step 101: According to a bandwidth adjustment indication message, adjust a quantity of time slots occupied by an ODUflex frame in a HO ODU at an egress side of each network node on an ODUflex channel.

Step 102: According to a rate adjustment indication message, adjust a transmission rate of the ODUflex frame of each network node on the ODUflex channel, so as to unify the transmission rate of each network node on the ODUflex channel.

It is noted that in the lossless adjustment method of ODUflex channel bandwidth provided in the embodiment of the present invention, the executing order of step 101 and step 102 can be changed according to an increase or a decrease of packet service traffic.

The lossless adjustment method of ODUflex channel bandwidth provided in the embodiment of the present invention achieves the lossless adjustment of ODUflex channel bandwidth by respectively adjusting a quantity of time slots occupied by an ODUflex frame in a HO ODU at an egress side of each network node on an ODUflex channel, and adjusting a transmission rate of an ODUflex frame of each network node on the ODUflex channel.

In order to describe the present invention more clearly, technical solutions provided in the present invention will be described through specific embodiments in the following.

Figure 2:
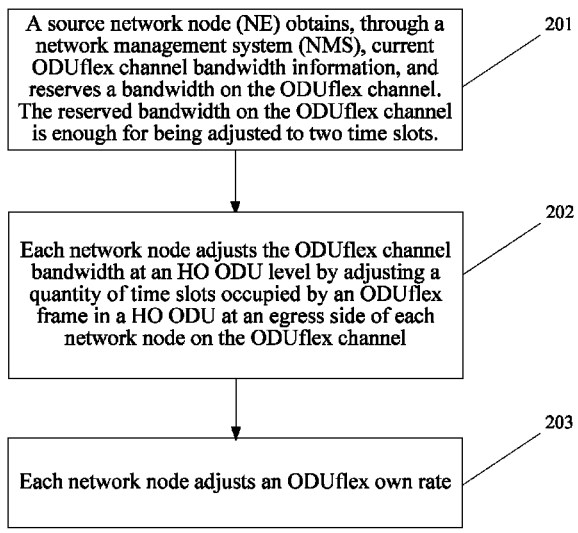
FIG. 2 is a flowchart of a lossless adjustment method of ODUflex channel bandwidth according to an embodiment of the present invention.

As shown in FIG. 2, an embodiment of the present invention provides a lossless adjustment method of ODUflex channel bandwidth with main steps in the following:

In the embodiment of the present invention, a scenario of increasing packet service traffic is taken as an example. It is assumed that an ODUflex frame originally occupies one time slot, and since the packet service traffic is increasing, the ODUflex frame needs to occupy two time slots. By using the technical solutions of the present invention, a process of adjusting the ODUflex channel bandwidth is in the following.

Step 201: A source network node (NE) obtains, through a network management system (NMS), current ODUflex channel bandwidth information, and reserves a bandwidth on the ODUflex channel. The reserved bandwidth on the ODUflex channel is enough for being adjusted to two time slots. If the bandwidth reservation is successful, a next operation is performed; otherwise, the source NE reports the information of unsuccessful bandwidth reservation.

Step 202: Each network node adjusts the ODUflex channel bandwidth at an HO ODU level by adjusting a quantity of time slots occupied by an ODUflex frame in a HO ODU at an egress side of each network node on the ODUflex channel.

Figure 3:
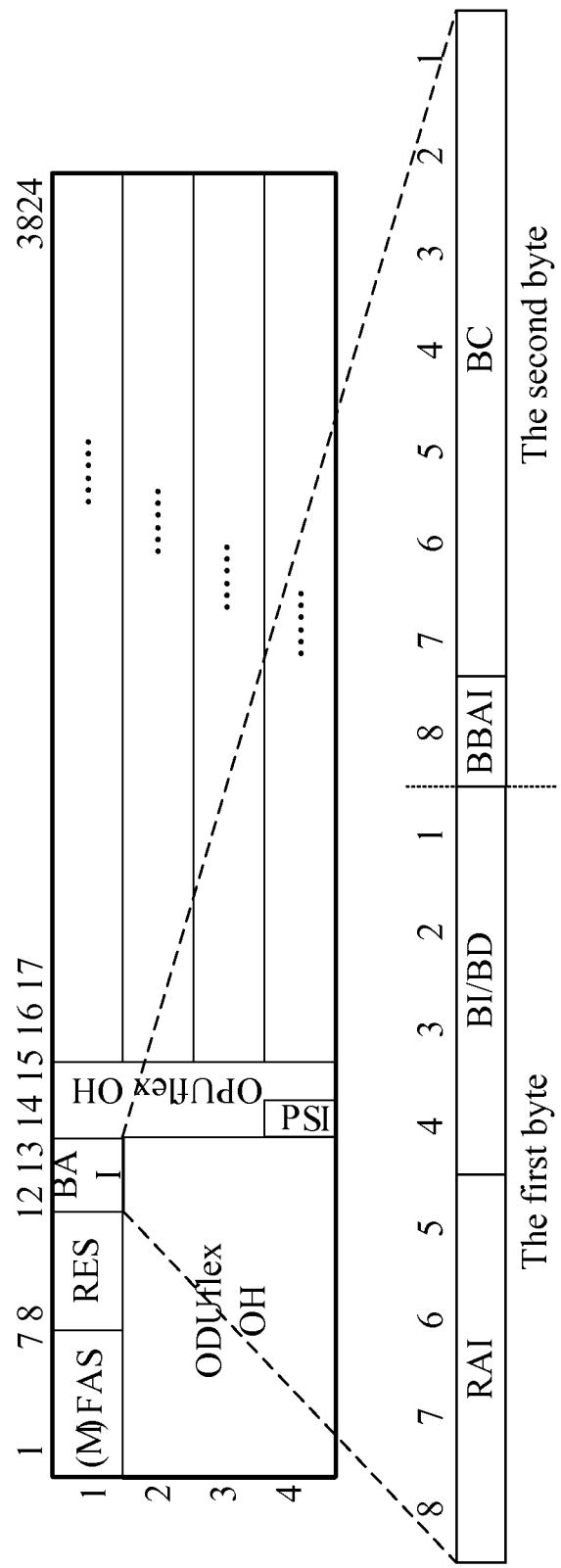
FIG. 3 is a structural diagram of an ODUflex frame that encapsulates a bandwidth adjustment indication message according to an embodiment of the present invention.

Operations of a Source NE:

1. A bandwidth adjustment indication message is generated. The bandwidth adjustment indication message and its encapsulation manner in the embodiment of the present invention is shown in FIG. 3. The bandwidth adjustment indication message used in adjusting the ODUflex channel bandwidth in an HO ODU is a bandwidth adjustment identifier (BAI). The BAI includes: a BI/BD (Bandwidth Increase/Bandwidth Decrease), which indicates an increase or a decrease of the ODUflex channel bandwidth, a BC (Bandwidth Capacity), which indicates the quantity of time slots that are occupied by an ODUflex frame, and a BBAI (Backward Bandwidth Adjustment Identifier), which returns an ODUflex channel bandwidth adjustment complete indication. When the ODUflex channel bandwidth needs to be increased, the BI/BD is "1010", and the BC is the quantity of time slots that need to be occupied by the ODUflex frame. When the ODUflex channel bandwidth needs to be decreased, the BI/BD is "0101", and the BC is the quantity of time slots that need to be occupied by the ODUflex frame. Under a normal situation, the BI/BD is "0000", and the BC is the quantity of time slots that are occupied currently. When the process of adjusting the ODUflex channel bandwidth in the HO ODU is completed, a destination network node returns a BBAI to a source network node. In this case, the BBAI is 1; under the normal situation, the BBAI is 0.

Where, a rate adjustment identifier (RAI) is a BAI that is used for ODUflex own rate adjustment.

When a transmission rate of an ODUflex frame needs to be adjusted, that is, an increase or a decrease of the rate, the RAI is "1010". When the rate adjustment is completed, the RAI is "0101". Under the normal situation, the RAI is "0000".

The BAI information and its encapsulation manner in the technical solutions of the present invention are not limited to the manners that are described above. The BAI information may further include some other information, such as cyclic redundancy check (CRC) information. An encapsulation location of the BAI information is not limited to bytes 13 and 14 of a first row, and may be placed in any reserved location in an ODUflex overhead, or may be placed in an HO ODU overhead.

In the embodiment of the present invention, the BI/BD is "1010" and the BC is 2, which indicates that the ODUflex channel bandwidth needs to be increased to two time slots. The bandwidth adjustment indication message is encapsulated into the ODUflex overhead to be transmitted.

2. The source network node indicates, through a payload structure identifier (PSI) that, allocating, by the HO ODU, the two time slots that need to be occupied by the ODUflex frame in the network node is to be completed.

When the ODUflex channel bandwidth in the HO ODU needs to be adjusted, it may be indicated, through a PSI of a 256-multiframe, that reallocating time slots to the ODUflex frame is to be completed; and a condition of occupying the time slots by the ODUflex frame is switched in a next 256-multiframe.

Figure 4:
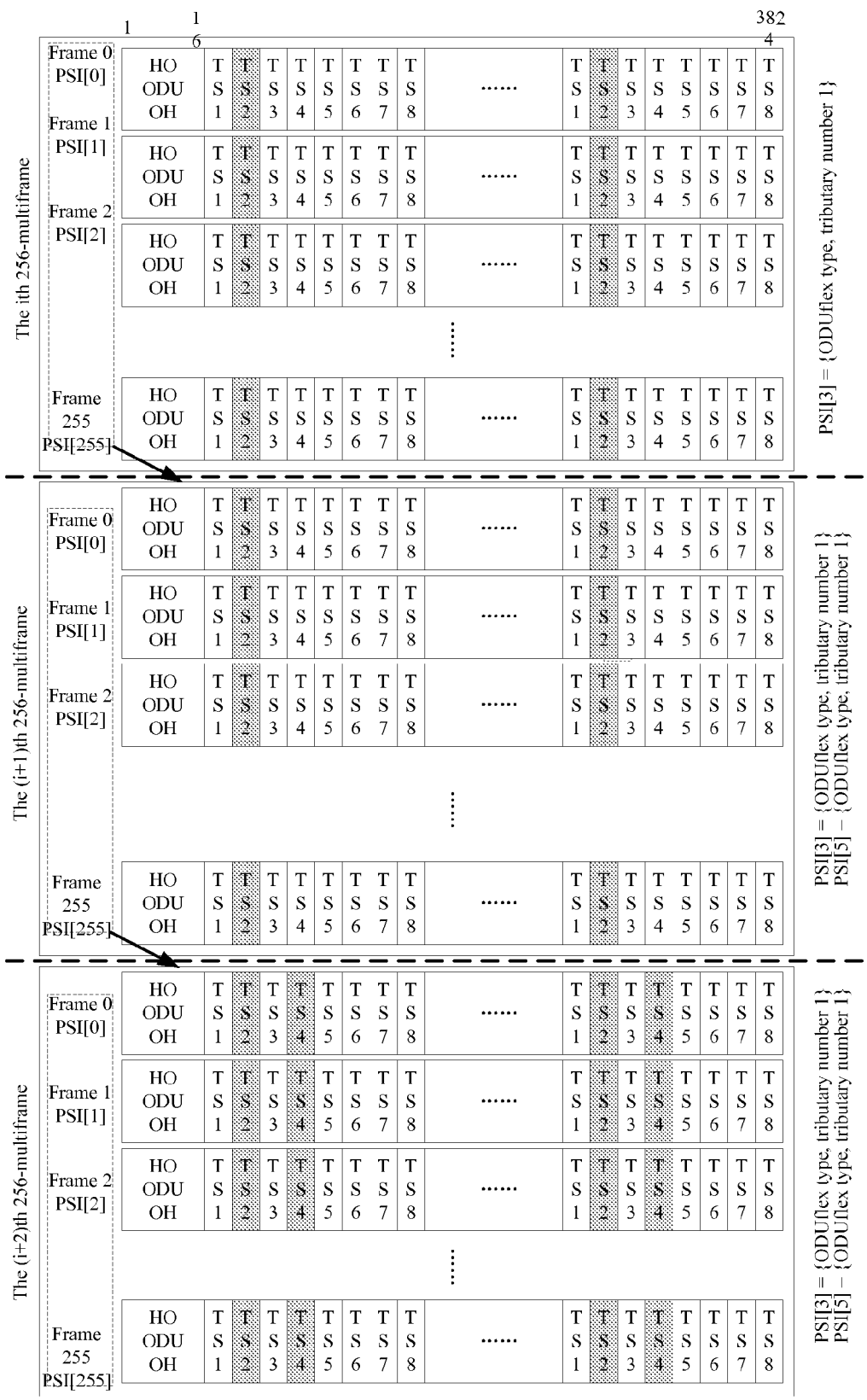
FIG. 4 is a schematic diagram of utilizing a payload structure identifier (PSI) to reallocate time slots occupied by an ODUflex frame in an HO ODU at an egress side of a network node according to an embodiment of the present invention.

An example of an ODUflex frame originally occupying one time slot in the HO ODU is adjusted to an ODUflex frame occupying two time slots is taken for description, where the HO ODU is divided into 8 time slots. As shown in FIG. 4, in an $i^{th}$ 256-multiframe, an ODUflex frame occupies one time slot, that is, the TS 2. In this case, the ODUflex channel bandwidth needs to be adjusted, and it is indicated, through a PSI, in an $(i+1)^{th}$ 256-multiframe that the ODUflex frame will occupy two time slots in an $(i+2)^{th}$ 256-multiframe, that is, TS 2 and TS 4. However, in the (i+1)$^{th}$ 256-multiframe, the ODUflex still occupies only one time slot, that is, the TS 2. In the (i+2)$^{th}$ 256-multiframe, number of time slots occupied by an ODUflex frame is increased to two, that is, TS 2 and TS 4.

In the adjustment process, since the transmission rate of the ODUflex frames is kept unchanged, and only the size of a container that bears the ODUflex frames is increased, the number of ODUflex frames that are borne in each frame of the HO ODU is kept unchanged, the number of ODUflex frames that are de-mapped from the HO ODU is unchanged, and a cache to store the ODUflex frames is in a balanced state. Therefore, the performance of a restored ODUflex clock is not affected, and the adjustment is a lossless adjustment process.

During the above process, the time of switching the real-located time slots may also be in other manners in addition to switching the time slots occupied by an ODUflex frame in the next 256-multiframe. For example, based on GMP payload block border, the condition of time slot occupied by an ODUflex frame is switched, and switching the condition of time slot occupied by an ODUflex frame is triggered through an overhead carried in the GMP. That is, in the embodiment, before the switch, the GMP payload block occupies one time slot; and after the switch, the GMP payload block occupies two time slots.

3. Wait till the time slot adjustment is completed, the BAI is modified to be normal, that is, the BI/BD is "0000", and the BC is 2; and the modified BAI, that is, the bandwidth adjustment complete message, is encapsulated into the ODUflex overhead to be transmitted.

4. A BAI complete indication returned by the destination network node is detected; when three ODUflexe frames are received continuously, and the BBAI is 1, it indicates that adjusting the ODUflex channel bandwidth at the HO ODU level is completed, that is, an ODUflex level may be triggered to start the adjustment of the ODUflex frame transmission rate of its own.

In the embodiment of the present invention, it is preset that when adjustment of ODUflex channel bandwidth at an HO ODU level of a destination network node is completed, three ODUflex frames that are encapsulated with BAI complete indication message are returned to a source network node. In other embodiments of the present invention, it may also be set that a destination network node returns, to a source network node, other ODUflex frames that are encapsulated with BAI complete indication message, which is not limited here by the present invention.

Operations of an Intermediate NE

When the intermediate NE needs to de-map an ODUflex frame from an HO ODU:

1. The intermediate NE receives BAI information at an ingress side, where BI/BD is "1010" and BC is 2, and therefore it is perceived that the ODUflex channel bandwidth needs to be increased to two time slots.

2. The BAI information is transparently transmitted immediately, and at an egress side, the BAI information with the BI/BD being "1010" and the BC being 2 is encapsulated into an ODUflex overhead to be sent out.

3. It is indicated, through a PSI, that the adjustment that the ODUflex needs to occupy two TSs in the HO ODU of the NE is to be completed.

4. After the adjustment is completed and the BAI information with the BI/BD being "1010" and the BC being 2 is no longer received; the BAI information is modified to be normal, that is, the BI/BD is "0000" and the BC is 2; and the modified BAI information is encapsulated to the ODUflex overhead to be sent out.

5. When the BBAI information from the destination network node is received, the BBAI information is transparently transmitted.

When the intermediate NE does no need to de-map an ODUflex frame from an HO ODU:

1. The intermediate NE directly transparently transmits the BAI information.

2. When the BBAI information from the destination network node is received, the BBAI information is transparently transmitted.

Operations of a Destination NE

1. The destination NE receives BAI information at an ingress side, where BI/BD is "1010" and BC is 2, and therefore it is perceived that the ODUflex channel bandwidth needs to be increased to two time slots.

2. Wait till BAI information with the BI/BD being "1010" and the BC being 2 sent from an upstream NE is no longer received, a complete indication BBAI of the adjustment of the ODUflex channel bandwidth in an HO ODU, that is, BBAI being 1, is returned to the source NE. The information that the BBAI is 1 is encapsulated into an ODUflex overhead that has three continuous frames, and is to be sent out; afterward, the BBAI is modified to be normal, that is, the BBAI is 0.

Step 203: Each network node adjusts an ODUflex own rate.

Operations of a Source NE

1. Preprocessing of ODUflex rate adjustment mainly includes: triggering a reading-enabled capacity of a packet service cache to be ineffective; only caching a packet service, but not reading a packet service from the cache; and subsequently encapsulating invalid data to an ODUflex frame (such as encapsulating a generic framing procedure (GFP) idle frame to an ODUflex frame), where the ODUflex frame no longer has valid data.

2. ODUflex rate increase indication RAI information, that is, RAI is "1010", is generated, and the information is encapsulated into an ODUflex overhead that has three continuous frames, and is to be sent out.

3. A ODUflex rate is adjusted, that is, an ODUflex clock is adjusted to be approximately two times of that of an original ODUflex rate so as to adjust the ODUflex rate to an expected rate.

4. Wait till the ODUflex clock adjustment is stabilized, ODUflex rate adjustment complete indication RAI information, that is, RAI is "0101", is generated, and the information is encapsulated into an ODUflex overhead that has three continuous frames, and is to be sent out, so as to indicate that the ODUflex rate adjustment is completed.

5. Processing after the ODUflex rate adjustment mainly includes: triggering the reading-enabled capacity of the packet service cache to be effective and obtain the packet service from the cache; and then encapsulating, through the GFP, the packet service to an ODUflex frame whose rate is adjusted.

6. In this case, the adjustment of the ODUflex channel bandwidth is completed; and the increase of packet service traffic may be triggered.

Operations of an Intermediate NE

When the intermediate NE needs to de-map an ODUflex frame from an HO ODU:

1. The intermediate network node transparently transmits a rate adjustment indication message.

2. An ODUflex frame is de-mapped from a received HO ODU frame, and smooth processing is performed on the ODUflex frame so as to facilitate stability of a restored ODUflex clock after an ODUflex frame rate is adjusted.

3. The intermediate network node transparently transmits a rate adjustment complete message.

In the embodiment of the present invention, the smooth processing during the ODUflex own rate adjustment frame process may adopt the following manner so as to remove the problem that the ODUflex clock that is restored during an ODUflex rate changing process is instable, thereby achieving lossless de-mapping of a packet service at a receiving end.

Figure 5:
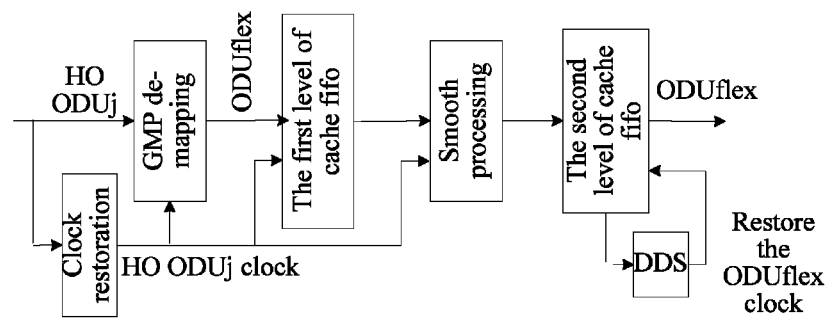
FIG. 5 is a schematic diagram of a smooth processing process according to an embodiment of the present invention.

As shown in FIG. 5, the smooth processing process is implemented through two levels of caches.

Firstly, ODUflex data flow that is de-mapped from an HO ODU frame is stored to a first level of cache.

And then, in a uniform increasing or decreasing manner, the data in the first level of cache is stored to a second level of cache till both two levels of caches reach a balanced state.

Lastly, the ODUflex clock is restored according to the second level of cache.

In the technical solutions provided in the present invention, the smooth processing of the destination NE and the intermediate NE during the ODUflex own rate adjustment process is not limited to the methods described in the embodiment, and any other methods that are capable of achieving the same effect may also be applicable.

When the intermediate NE does not need to de-map an ODUflex frame from an HO ODU:

1. The intermediate network node transparently transmits a rate adjustment indication message.

2. The intermediate network node transparently transmits a rate adjustment complete message.

3. The intermediate network node transparently transmits the HO ODU.

Operations of a Destination NE

1. An ODUflex frame whose rate is increasing is de-mapped from an HO ODU.

2. Smooth transition processing is performed on the de-mapped ODUflex data flow to make the restored ODUflex clock stable so as to achieve the lossless de-mapping of ODU-flex frames.

3. Frame positioning and RAI identification processing are performed on the ODUflex data flow. When three frames of ODUflexes including a rate adjustment indication that the RAI is "1010" are received continuously, all subsequent ODUflex frames are discarded since data borne by the ODU-flex in this case is invalid; the frame positioning is performed on the ODUflex data flow again till an ODUflex frame header is locked and three frames of ODUflexes including a rate adjustment complete indication that an RAI is "0101" are received continuously, de-mapping processing is performed on subsequent ODUflex frames since data borne by the ODU-flex in this case is valid.

The embodiment of the present invention achieves the lossless adjustment of ODUflex channel bandwidth by respectively adjusting a quantity of time slots occupied by an ODU-flex frame in a HO ODU at an egress side of each network node on an ODUflex channel, and adjusting a transmission rate of an ODUflex frame of each network node on the ODU-flex channel.

Figure 6:
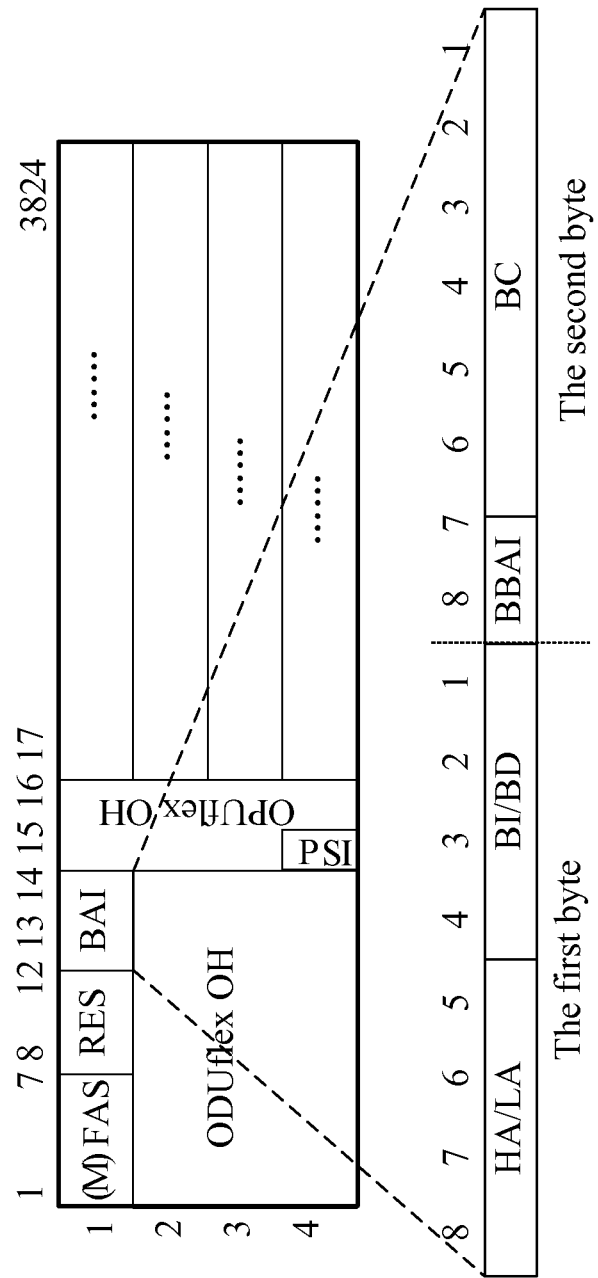
FIG. 6 is a structural diagram of an ODUflex frame that encapsulates a rate adjustment indication message according to an embodiment of the present invention.

Further, an embodiment of the present invention also provides a lossless adjustment method of ODUflex channel bandwidth. In comparison with the above embodiment, the differences merely lie in that the steps of adjusting an ODU-flex own rate by each network node, in which a placing manner of RAI information that is used in the ODUflex own rate adjustment is shown in FIG. 6. When an HA/LA (High Order/Low Order Adjustment Identifier) is "1010", it indicates BAI information which is used at an HO ODU level; when the HA/LA is "0101", it indicates the RAI information which is used in the ODUflex own rate adjustment. The ODUflex own rate adjustment is described in the following, so the HA/LA is "0101".

Operations of a Source NE

1. Preprocessing of ODUflex rate adjustment mainly includes: triggering a reading-enabled capacity of a packet service cache to be ineffective; only caching a packet service, but not reading a packet service from the cache; and subsequently encapsulating invalid data into an ODUflex frame, where the ODUflex frame no longer includes valid data.

2. Generating an ODUflex rate increase indication RAI, that is, the BI/BD is "1010" and the BC is 2, and the information is encapsulated into an ODUflex frame overhead that has three continuous frames and is to be transmitted.

3. The transmission rate of the ODUflex frames is adjusted, that is, the ODUflex clock is adjusted to be approximately two times of that of an original ODUflex frame so as to adjust the ODUflex rate to an expected rate.

4. Wait till the ODUflex clock adjustment is stabilized, ODUflex rate adjustment complete indication RAI, that is, BI/BD is "0000", is generated, and the information is encapsulated into an ODUflex overhead that has three continuous frames, and is transmitted, so as to indicate that the ODUflex rate adjustment is completed in the NE.

5. An RAI complete indication returned by the destination NE is detected.

6. Processing after the ODUflex rate adjustment mainly includes that after the RAI complete indication returned from the destination NE, that is, the BBAI being 1, is received, the reading-enabled capacity of the packet service cache is triggered to be effective and the packet service is obtained from the cache; and then the packet service is encapsulated, through the GFP, to an ODUflex frame whose rate is adjusted.

7. In this case, adjusting the ODUflex channel bandwidth is completed; and the increase of packet service traffic may be triggered.

Operations of an Intermediate NE

When the intermediate NE needs to de-map an ODUflex frame from an HO ODU:

1. An ODUflex frame is de-mapped from an HO ODU.

2. Frame positioning and RAI identification processing are performed on an ODUflex flow. When three frames of ODU-flex rate adjustment increase indication which includes that the BI/BD is "1010" are received, it indicates that a subsequent ODUflex data flow is invalid data that is generated during an ODUflex rate adjustment period; a rate level BC being 2 that is needed by ODUflex to be adjusted is obtained; ODUflex clock adjustment is triggered according to an obtained ODUflex adjustment rate level, and the ODUflex rate is adjusted to an expected rate; and at the same time an ODUflex rate adjustment increase indication which includes that the BI/BD is "1010" is continued to be sent to a direction of a destination network node.

3. Wait till the ODUflex clock adjustment is stabilized and ODUflex rate adjustment complete indication message transmitted from an upstream is locked and identified, rate adjustment complete message is sent to indicate that the ODUflex rate adjustment of upstream NEs including the NE is completed.

4. The intermediate network node transparently transmits the rate adjustment complete message returned from the destination network node.

When the intermediate NE does not need to de-map an ODUflex frame from an HO ODU:

The intermediate network node transparently transmits a rate adjustment indication message.

The intermediate network node transparently transmits a rate adjustment complete message.

The intermediate network node transparently transmits an HO ODU.

The intermediate network node transparently transmits the rate adjustment complete message returned from the destination network node.

Operations of a Destination NE

1. An ODUflex frame is de-mapped from an HO ODU.
2. Frame positioning and RAI identification processing are performed on the ODUflex flow. When three frames of ODUflex rate adjustment increase indication including that the BI/BD is "1010" are received continuously, it indicates that a subsequent ODUflex data flow is invalid data generated during an ODUflex rate adjustment period; a rate level BC being 2 that is required by the ODUflex to be adjusted is obtained; at the same time, the frame positioning processing on the ODUflex flow is triggered again till an ODUflex frame header is locked and three frames of ODUflex rate adjustment complete indication including that the BI/BD is "0101" are received continuously, it indicates that the ODUflex rate adjustment period of an upstream NE ends.
3. When an ODUflex rate adjustment indication that is transmitted from an upstream is locked and identified, ODUflex clock adjustment is triggered according to an obtained ODUflex adjustment rate level and the ODUflex rate is adjusted to an expected rate.
4. Wait till the ODUflex clock adjustment is stabilized and ODUflex rate adjustment complete indication RAI information which is transmitted from the upstream is locked and identified, an indication indicating that ODUflex rate adjustment of a whole channel is completed, that is, BBAI is 1, is returned to an source NE; and three frames are continuously returned.

In the embodiment of the present invention, rate adjustment is performed on a source node, an intermediate node and a destination node, the source node is notified after rates are kept stabilized, and the source node triggers a next operation, thereby achieving the lossless adjustment of ODUflex own rate.

Figure 7:
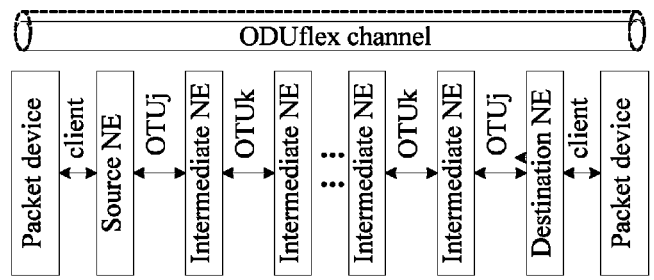
FIG. 7 is a structural diagram of an ODUflex channel according to an embodiment of the present invention.

As shown in FIG. 7, an embodiment of the present invention provides an ODUflex channel, which includes: a source network node, at least one intermediate network node and a destination network node. The source network node is configured to create a bandwidth adjustment indication message and a rate adjustment indication message, where the bandwidth adjustment indication message and the rate adjustment indication message are encapsulated in an HO ODU overhead or an ODUflex frame overhead and are transmitted to the intermediate network node and the destination network node.

The source network node, intermediate network node and destination network node are configured to respectively adjust, according to the bandwidth adjustment indication message, a quantity of time slots occupied by an ODUflex frame in a HO ODU at an egress side.

The source network node, intermediate network node and destination network node are configured to adjust, according to the rate adjustment indication message, a transmission rate of an ODUflex frame.

Figure 8:
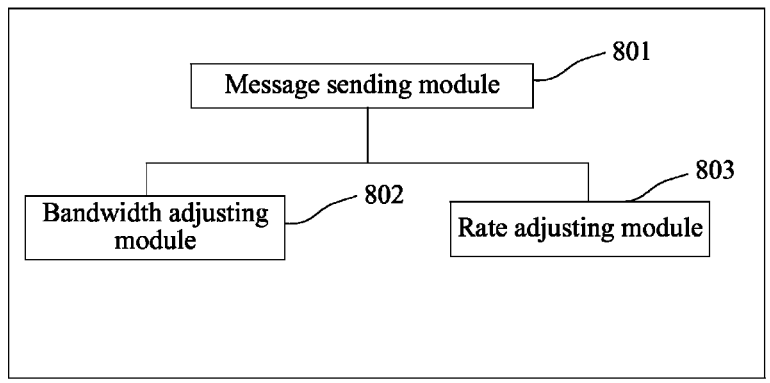
FIG. 8 is a structural diagram of a source network node in an ODUflex channel according to an embodiment of the present invention.

Further, referring to FIG. 8, the source network node includes:

a message sending module 801, configured to create the bandwidth adjustment indication message and the rate adjustment indication message and send the bandwidth adjustment indication message and the rate adjustment indication message;

a bandwidth adjusting module 802, configured to adjust, according to the bandwidth adjustment indication message, a time slot occupied by an ODUflex frame in a HO OUD at an egress side; and a rate adjusting module 803, configured to adjust, according to the rate adjustment indication message, a transmission rate of an ODUflex frame.

The ODUflex channel provided in the embodiment of the present invention adjusts a time slot occupied by an ODUflex frame in a HO ODU at an egress side of each network node on an ODUflex channel and adjusts a transmission rate of an ODUflex frame of each network node on the ODUflex channel separately; and after the adjustment is completed, a source network node triggers change of packet service traffic, thereby achieving the lossless adjustment of ODUflex channel bandwidth.

Those of ordinary skills in the art should understand that all or a part of the steps of the method according to the embodiments of the present invention may be implemented by program instructing relevant hardware. The program may be stored in a computer readable storage medium, such as a Read-Only Memory (ROM), a Random-Access Memory (RAM), a magnetic disk, or an optical disk.

The above is only the specific implementation of the present invention, but the protection scope of the present invention is not limited thereto. Any change or replacement that can be easily derived by persons skilled in the art within the technical scope disclosed by the present invention shall fall within the protection scope of the present invention. Therefore, the protection scope of the present invention shall be subject to the protection scope of the claims.

What is claimed is:

1. A method for adjusting a bandwidth of a flexible Optical channel Data Unit (ODUflex) channel configured in an optical transport network (OTN), wherein the ODUflex channel passes through a source network node, at least one intermediate network node and a destination network node, the method comprising:

adjusting a quantity of time slots occupied by an ODUflex frame in a Higher Order Optical Channel Data Unit (HO ODU) at each network node on the ODUflex channel; and adjusting a transmission rate of the ODUflex frame at the each network node on the ODUflex channel, so that the transmission rate of the frame is unified across the network nodes on the ODUflex channel;

wherein adjusting the quantity of time slots occupied by the ODUflex frame at each network node on the ODUflex channel comprises:

creating, by the source network node, a bandwidth adjustment indication message, and transmitting, by the source network node, the bandwidth adjustment indication message to an intermediate network node;

adjusting, by the source network node, the quantity of time slots occupied by the ODUflex frame;

after the source network node completes the adjustment, transmitting, by the source network node, a first bandwidth adjustment complete message to the intermediate network node;

transmitting, by the intermediate network node, the bandwidth adjustment indication message to another intermediate network node or the destination network node;

adjusting, by the intermediate network node, the quantity of time slots occupied by the ODUflex frame according to the bandwidth adjustment indication message; and transmitting, by the intermediate network node, the first bandwidth adjustment complete message to the other intermediate network node or the destination network node.

2. The method according to claim 1, wherein adjusting the quantity of time slots occupied by the ODUflex frame at each network node on the ODUflex channel further comprises:
adjusting, by the destination network node, the quantity of time slots occupied by the ODUflex frame according to the bandwidth adjustment indication message; and
returning, by the destination network node, a second bandwidth adjustment complete message to the source network node.

3. The method according to claim 1, wherein adjusting the transmission rate of the ODUflex frame at each network node on the ODUflex channel comprises:
suspending from obtaining data of a packet service from a cache, and encapsulating a current ODUflex frame using invalid data;
creating, by the source network node, a rate adjustment indication message, and sending the rate adjustment indication message to an intermediate network node on the ODUflex channel;
adjusting, by the source network node, the transmission rate of the ODUflex frame;
after the source network node completes the adjustment of the transmission rate of the ODUflex frame, creating, by the source network node, a first rate adjustment complete message, and transmitting the first rate adjustment complete message to the intermediate network node on the ODUflex channel;
resuming obtaining the data of the packet service from the cache, and encapsulating a next ODUflex frame with the packet service data; and
further encapsulating the ODUflex frames to an HO ODU frame, and sending the HO ODU frame to the intermediate network node in accordance with the adjusted transmission rate.

4. The method according to claim 3, wherein adjusting the transmission rate of the ODUflex frame at each network node on the ODUflex channel further comprises:
transmitting, by the intermediate network node, the rate adjustment indication message to another intermediate network node or the destination network node;
adjusting, by the intermediate network node, the transmission rate of the ODUflex frame according to the rate adjustment indication message;
transmitting, by the intermediate network node, the first rate adjustment complete message to the other intermediate network node or the destination network node; and
transmitting, by the intermediate network node, the HO ODU frame to the other network node or the destination network node in accordance with the adjusted transmission rate.

5. The method according to claim 4, wherein adjusting the transmission rate of the ODUflex frame at each network node on the ODUflex channel further comprises:
receiving, by the destination network node, the HO ODU frame;
obtaining, by the destination network node, the ODUflex frames from the received HO ODU frame, and then storing the ODUflex frames in a first cache;
reading data from the first cache, and then storing, in a uniform increasing or decreasing manner, the data into to a second cache till both the first cache and the second cache reach a balanced state;
restoring an ODUflex clock according to the second cache; and
obtaining, by the destination network node, according to the rate adjustment indication message and the first rate adjustment complete message, from the HO ODU, the ODUflex frame encapsulated with the packet service data.

6. The method according to claim 1, wherein adjusting the transmission rate of the ODUflex frame at each network node on the ODUflex channel comprises:
suspending from obtaining data of a packet service from a cache, and encapsulating a current ODUflex frame using invalid data;
creating, by the source network node, a rate adjustment indication message, and sending the rate adjustment indication message to an intermediate network node on the ODUflex channel;
adjusting, by the source network node, the transmission rate of the ODUflex frame;
after the source network node completes the adjustment of the transmission rate of the ODUflex frame, creating, by the source network node, a first rate adjustment complete message, and transmitting the first rate adjustment complete message to the intermediate network node on the ODUflex channel; and
after detecting a second rate adjustment complete message returned from the destination network node, resuming obtaining the data of the packet service from the cache, and encapsulating a next ODUflex frame with the packet service data; and
further encapsulating the ODUflex frames to an HO ODU frame, and sending the HO ODU frame to the intermediate network node in accordance with the adjusted transmission rate.

7. The method according to claim 6, wherein adjusting the transmission rate of the ODUflex frame at each network node on the ODUflex channel further comprises:
transmitting, by the intermediate network node, the rate adjustment indication message to another intermediate network node or the destination network node;
adjusting, by the intermediate network node, the transmission rate of the ODUflex frame according to the rate adjustment indication message;
transmitting, by the intermediate network node, the first rate adjustment complete message to the other intermediate network node or the destination network node; and
transmitting, by the intermediate network node, the HO ODU frame to the other network node or the destination network node in accordance with the adjusted transmission rate.

8. The method according to claim 7, wherein adjusting the transmission rate of the ODUflex frame at each network node on the ODUflex channel further comprises:
receiving, by the destination network node, the HO ODU frame;
obtaining, by the destination network node, the ODUflex frames from the received HO ODU frame;
upon receiving the rate adjustment indication message, adjusting, by the destination network node, the transmission rate of the ODUflex frame; and
when the transmission rate of the ODUflex frame is stabilized to be an expected rate and the first rate adjustment complete message is received, returning, by the destination network node, a second rate adjustment complete message to the source network node.

9. An optical transport network (OTN) providing a flexible Optical channel Data Unit (ODUflex) channel which passes through a source network node, at least one intermediate network node and a destination network node, wherein each network node is configured to:
  adjust a quantity of time slots occupied by an ODUflex frame in a Higher Order Optical Channel Data Unit (HO ODU); and
  adjust a transmission rate of the ODUflex frame, so that the transmission rate of the ODUflex frame is unified across the network nodes on the ODUflex channel;
  wherein in adjusting the quantity of time slots occupied by the ODUflex frame, the source network node is configured to: create a bandwidth adjustment indication message, and transmit the bandwidth adjustment indication message to an intermediate network node; adjust the quantity of time slots occupied by the ODUflex frame; and after the adjustment is completed, transmit a first bandwidth adjustment complete message to the intermediate network node;
  wherein in adjusting the quantity of time slots occupied by the ODUflex frame, the intermediate network node is configured to: transmit the bandwidth adjustment indication message to another intermediate network node or the destination network node; adjust the quantity of time slots occupied by the ODUflex frame according to the bandwidth adjustment indication message; and transmit the first bandwidth adjustment complete message to the other intermediate network node or the destination network node.

10. The OTN according to claim 9, wherein in adjusting the quantity of time slots occupied by the ODUflex frame, the destination network node is configured to:
  adjusting the quantity of time slots occupied by the ODUflex frame according to the bandwidth adjustment indication message; and
  return a second bandwidth adjustment complete message to the source network node.

11. The OTN according to claim 9, wherein in adjusting the transmission rate of the ODUflex frame, the source network node is configured to:
  suspend from obtaining data of a packet service from a cache, and encapsulate a current ODUflex frame using invalid data;
  create a rate adjustment indication message, and send the rate adjustment indication message to an intermediate network node on the ODUflex channel;
  adjust the transmission rate of the ODUflex frame;
  after the adjustment of the transmission rate of the ODUflex frame is completed, create first rate adjustment complete message, and transmit the first rate adjustment complete message to the intermediate network node on the ODUflex channel;
  resume obtaining the data of the packet service from the cache, and encapsulate a next ODUflex frame with the packet service data; and
  further encapsulate the ODUflex frames to an HO ODU frame, and send the HO ODU frame to the intermediate network node in accordance with the adjusted transmission rate.

12. The OTN according to claim 11, wherein in adjusting the transmission rate of the ODUflex frame, the intermediate network node is configured to:
  transmit the rate adjustment indication message to another intermediate network node or the destination network node;
  adjust the transmission rate of the ODUflex frame according to the rate adjustment indication message;
  transmit the first rate adjustment complete message to the other intermediate network node or the destination network node; and
  transmit the HO ODU frame to the other network node or the destination network node in accordance with the adjusted transmission rate.

13. The OTN according to claim 12, wherein in adjusting the transmission rate of the ODUflex frame, the destination network node is configured to:
  receive the HO ODU frame;
  obtain the ODUflex frames from the received HO ODU frame, and then store the ODUflex frames in a first cache;
  read data from the first cache, and then store, in a uniform increasing or decreasing manner, the data into to a second cache till both the first cache and the second cache reach a balanced state;
  restore an ODUflex clock according to the second cache; and
  obtain, according to the rate adjustment indication message and the first rate adjustment complete message, from the HO ODU, the ODUflex frame encapsulated with the packet service data.

14. The OTN according to claim 9, wherein in adjusting the transmission rate of the ODUflex frame, the source network node is configured to:
  suspend from obtaining data of a packet service from a cache, and encapsulate a current ODUflex frame using invalid data;
  create a rate adjustment indication message, and send the rate adjustment indication message to an intermediate network node on the ODUflex channel;
  adjust the transmission rate of the ODUflex frame;
  after the adjustment of the transmission rate of the ODUflex frame is completed, create a first rate adjustment complete message, and transmit the first rate adjustment complete message to the intermediate network node on the ODUflex channel; and
  after detecting a second rate adjustment complete message returned from the destination network node, resume obtaining the date of the packet service from the cache, and encapsulate a next ODUflex frame with the packet service data; and
  further encapsulate the ODUflex frames to an HO ODU frame, and send the HO ODU frame to the intermediate network node in accordance with the adjusted transmission rate.

15. The OTN according to claim 14, wherein in adjusting the transmission rate of the ODUflex frame, the intermediate network node is configured to:
  transmit the rate adjustment indication message to another intermediate network node or the destination network node;
  adjust the transmission rate of the ODUflex frame according to the rate adjustment indication message;
  transmit the first rate adjustment complete message to the other intermediate network node or the destination network node; and
  transmit the HO ODU frame to the other network node or the destination network node in accordance with the adjusted transmission rate.

16. The OTN according to claim 15, wherein in adjusting the transmission rate of the ODUflex frame, the destination network node is configured to:
  receive the HO ODU frame;
  obtain the ODUflex frames from the received HO ODU frame;

upon receiving the rate adjustment indication message, adjust the transmission rate of the ODUflex frame; and when the transmission rate of the ODUflex frame is stabilized to be an expected rate and the first rate adjustment complete message is received, return a second rate adjustment complete message to the source network node.

* * * * *